United States Patent

Penney et al.

[11] Patent Number: 5,943,508
[45] Date of Patent: Aug. 24, 1999

[54] SWITCHER USING SHARED DECOMPRESSION PROCESSORS FOR PROCESSING BOTH BROADBAND AND COMPRESSED VIDEO DATA

[75] Inventors: Bruce J. Penney, Aloha; Philip S. Crosby, Portland, both of Oreg.

[73] Assignee: Tektronix, Inc., Wilsonville, Oreg.

[21] Appl. No.: 08/901,042

[22] Filed: Jul. 28, 1997

[51] Int. Cl.[6] ...................................................... H04N 5/46
[52] U.S. Cl. .......................... 395/871; 348/706; 348/705; 348/159
[58] Field of Search .................................. 395/871, 706; 348/426, 445, 575, 722, 705, 159, 512

[56] References Cited

U.S. PATENT DOCUMENTS

| | | | |
|---|---|---|---|
| 4,853,784 | 8/1989 | Abt et al. | 358/181 |
| 4,858,011 | 8/1989 | Jackson et al. | 358/181 |
| 5,241,371 | 8/1993 | Fukushima et al. | 358/22 |
| 5,325,131 | 6/1994 | Penney | 348/706 |
| 5,568,204 | 10/1996 | Takamori | 348/705 |
| 5,606,364 | 2/1997 | Kim | 348/159 |
| 5,751,368 | 5/1998 | Cooper | 348/512 |

FOREIGN PATENT DOCUMENTS 3838000  5/1990  Germany .

WO 97/08898  3/1997  WIPO .

*Primary Examiner*—Thomas C. Lee
*Assistant Examiner*—Harold Kim
*Attorney, Agent, or Firm*—Francis I. Gray

[57] ABSTRACT

A switcher using shared processors has an input matrix with a plurality of inputs to which a corresponding plurality of sources may be coupled. One or more of the sources may provide compressed data. The input matrix routes selected ones of the sources to a plurality of outputs which is less in number than the number of inputs, the routing being determined by a tally output. A pool of processors, such as compression decoders, color correctors or the like, are coupled to the outputs of the input matrix as needed for processing those sources that require such processing to provide processed data. The outputs of the processors provide processed data to a conventional switcher that combines the selected processed data to provide a program output. The conventional switcher also provides the tally output. For sources that provide inter-frame compressed data, the conventional switcher provides a preview output and a preview tally output so that the necessary time delay for decompressing such data is anticipated to minimize delay in switching the preview output to the program output. A resource management module keeps track of which processors are committed to which sources.

2 Claims, 1 Drawing Sheet

SWITCHER USING SHARED DECOMPRESSION PROCESSORS FOR PROCESSING BOTH BROADBAND AND COMPRESSED VIDEO DATA

BACKGROUND OF THE INVENTION

The present invention relates to the switching of signals, and more particularly to a switcher that uses shared processors, such as compression decoders, color correctors or the like.

It is projected that, particularly in an HDTV (High Definition TeleVision) plant, most of the disk and storage devices in a television plant will use compression. It is desirable to interconnect these devices in their native compressed formats. One problem with this approach is that production switchers, master control switchers and digital effects systems, all of which operate in a non-compressed format, require de-compression functions on their inputs. For a large switcher with a great number of inputs this could result in a significant economic burden due to the large number of de-compression functions required, i.e., one for each input. Other functions also are desired in a switcher, such as color correctors. But again having a color corrector for each input is expensive in cost and hardware.

Although a switcher has a large number of inputs, only a small number of them are actually active at the output of the switcher. For the majority of the time there may actually only be one input routed to the output of the switcher. The switcher typically includes a tally function that indicates all of the inputs which are actively used to generate a program output at any particular time. Typically where two videos are combined, one a foreground video and another a background video like a weather man in front of a weather map, and characters are overlaid on top, three input sources are being used to create the program output, and the tally function causes switcher lights to illuminate, indicating the three inputs being used.

What is desired is a switcher with multiple inputs that minimizes the number of processing functions required at the input to produce a program output.

BRIEF SUMMARY OF THE INVENTION

Accordingly the present invention provides a switcher with multiple inputs using shared processors that has an input stage architecture which allows automated assignment from a small number of processor functions based on the output requirements of the switcher rather than requiring a large number of processor functions based on the input size of the switcher. The sources are input to an input matrix for routing to a pool of processors that perform a specified processing function, such as compression decoding, color correcting or the like. The number of processors is determined by the maximum number of sources that can be combined into outputs of the switcher. A tally output from the switcher is fed back to the input matrix to initiate a change in the routing, such as during the vertical interval of the program output for a video signal. A resource manager is coupled to the input matrix, the video processors and the switcher to keep track of which processors are committed to which resources. For processing of multiple frame groups of pictures in a compressed environment, a preview output and a preview tally output also are provided by the switcher, with the preview tally output being fed back to the input matrix.

The objects, advantages and other novel features of the present invention are apparent from the following detailed description when read in conjunction with the appended claims and attached drawing.

DETAILED DESCRIPTION OF THE INVENTION

Figure 1:
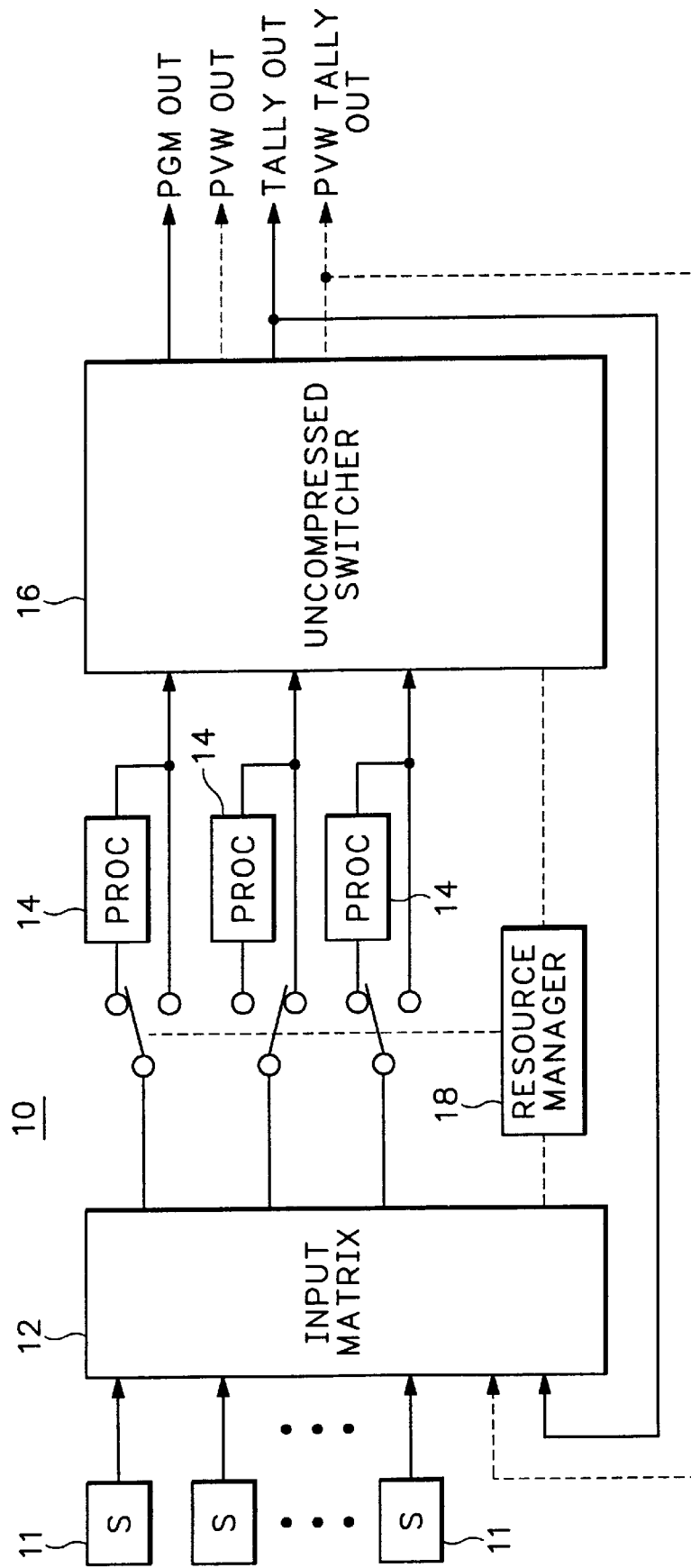
FIG. 1 is a block diagram view of a switcher using shared processors according to the present invention.

Referring now to FIG. 1 a switcher 10 has a plurality of input sources 11, one or more of which may contain compressed data or data that needs to be otherwise processed prior to being produced at a program output. The input sources 11 are coupled to the inputs of an input matrix 12. The number of outputs from the input matrix 12 is less than the number of inputs, but provides enough outputs to accommodate the maximum number of outputs required by the switcher 10. Further where the input sources are mixed between compressed and uncompressed data sources, the input matrix 12 includes means for detecting whether the input source is compressed or uncompressed. A plurality of processors 14, such as compression decoders, color correctors or the like, are switchably coupled to the outputs of the input matrix 12, with data to be processed being routed through one of the processors. The unprocessed data directly from the outputs of the input matrix 12 or the processed data from the processors 14 are input in an appropriate format to a conventional switcher 16 which provides at a minimum a program output and a program tally output. The program tally output also is provided as an input to the input matrix 12 to select the routing of the data from the input sources 11 through the input matrix 12, making the routing changes during the vertical interval for a video signal, to create the desired program output. A resource management module 18, which may be independent or part of either the input matrix 12 or the conventional switcher 16, communicates with the input matrix, the processors 14 and the conventional switcher 16 to automatically assign one or more of the processors as needed at the outputs of the input matrix 12.

If all of the input sources 11 are in the form of compressed data, the processors 14 are compression decoders and the resource manager 18 keeps track of which of the compression decoders are currently being used. All outputs from the input matrix 12 that appear in the program output from the conventional switcher 16 are decoded. In this case the compression decoders 14 may be hardwired to the outputs from the input matrix 12.

In the case of intra-frame coding, i.e., where the coding is frame-bound, one of the outputs of the input matrix 12 may be assigned to one of the input sources 11 in response to the tally signal at a time corresponding to the beginning of a first frame of video that is used at the output. The resource manager 18 assures that one of the compression decoders 14 is coupled to the output to decompress the data. Decoding delays are pipelined in the conventional switcher 16 so that the tally signal alone is an adequate indicator of the required input sources 11, and together with the resource manager 18 defines the compression decoders 14 required.

In the case of compression coding using a long group of pictures (GOP) where the compression is inter-frame, however, the compression decoder 14 may depend on earlier compressed data to reconstruct any particular output frame. Therefore with compression coding of longer GOPs, advance assignment of required compression decoders 14 is required. It is common to use a preview bus in switchers to allow presetting of input sources 11 and effects before they are actually used. By combining the tally signal from this preview or preset bus with the tally signal from the program bus, compression decoders 14 may be assigned to provide a preview output before their outputs are actually required to create the program output. This allows the compression decoders 14 to be primed with a full GOP or more of input data before the program output is required.

In operation when an operator selects at the conventional switcher 16 certain input sources 11 to be part of the program output, the input matrix 12 indicates to the resource manager 18 whether the desired source is compressed or uncompressed. For uncompressed sources the resource manager 18 does not switch in any of the compression decoders 14 and the data passes directly from the output of the input matrix 12 to the conventional switcher 16. However for compressed sources the resource manager 18 assigns the next available compression decoder 14 to the appropriate output of the input matrix 12 so that the conventional switcher 16 receives the data in uncompressed format. The conventional switcher 16 combines the provided uncompressed data to produce the desired program output.

For compressed sources using long GOPs the operator indicates not only what is desired for the program output, but then also what is desired for a preview output, i.e., the next change that will appear in the program output. The resource manager 18 interacts with the input matrix, decoders 14 and switcher 16 together with the preview tally, as indicated above, to provide the preview output. The preview output allows the compression decoders 14 to process GOPs without appreciable delay, starting with the first frame of the next GOP, when a change in the program output is desired.

As another example where the processors 14 are color correctors, assignment of the color correctors to the outputs of the input matrix 12 gives the apparent indication to the operator that all of the inputs have a color corrector associated with them. The operator initially assigns color correction parameters for each input source 11, and these parameters are stored in the resource manager 18. When a color corrector 14 is assigned by the resource manager 18 to an output of the input matrix 12, the appropriate parameters also are passed on to the color corrector by the resource manager. The various types of processors 14 may be switchably cascaded together so that a compressed data signal is decompressed and then color corrected, or an uncompressed data signal is color corrected, or no processing is done for the particular input source 11, as needed.

Thus the present invention provides a switcher using shared processors that are less in number than the number of inputs to an input matrix for the switcher, which processors, including compression decoders, color correctors and the like, are assigned to the outputs of the input matrix as needed to produce a program output from a conventional switcher.

What is claimed is:

1. A switcher comprising:

an input matrix having a plurality of inputs for receiving video data from respective video data sources, the video data sources including both compressed video data sources providing compressed video data and broadband video data sources providing broadband video data, and for routing video data received from the video data sources at the inputs to a plurality of outputs, the number of outputs being less than the number of inputs;

a plurality of decompression processors equal in number to the number of outputs of the input matrix, each decompression processor having an input and an output for converting compressed video data at the input to broadband video data at the output;

a broadband video switcher having a plurality of inputs equal in number to the number of outputs of the input matrix for combining broadband video data at the inputs to provide program video data and preview video data as well as a tally output and a preview tally output, the tally output and preview tally output being input to the input matrix for determining which video data at the inputs of the input matrix are routed to which outputs;

means for selectively coupling the decompression processors between the outputs of the input matrix and the inputs of the broadband video switcher so that compressed video data at the outputs of the input matrix are converted to broadband video data before input to the broadband video switcher and broadband video data at the outputs of the input matrix are input directly to the broadband video switcher; and a resource manager coupled to the input matrix, decompression processors and broadband video switcher to automatically assign the decompression processors to the outputs of the input matrix that have compressed video data, including advance assignment of the decompression processors for providing video data for the preview video data before the preview video data is needed as the program video data.

2. The switcher as recited in claim 1 wherein the input matrix comprises means for detecting whether the video data source connected to one of the inputs is a compressed video data source, and the resource manager comprises means for generating a switch signal to the selectively coupling means for one of the decompression processors to couple the selected decompression processor to the corresponding output of the input matrix when the detecting means indicates the video data source provides compressed video data.

\* \* \* \* \*